United States Patent [19]

Lebret

[11] Patent Number: 5,176,428
[45] Date of Patent: Jan. 5, 1993

[54] HYDRAULIC PUMP

[75] Inventor: Pierre Lebret, Le Chesney, France

[73] Assignee: Bendix Europe Services Techniques, Drancy, France

[21] Appl. No.: 774,901

[22] Filed: Oct. 11, 1991

[30] Foreign Application Priority Data

Oct. 30, 1990 [FR] France .................. 90-13433

[51] Int. Cl.⁵ .................. B60T 8/32; B60T 17/02; F04B 21/02; F04B 49/08
[52] U.S. Cl. ................... 303/10; 60/533; 303/61; 303/116.4; 303/901; 417/305
[58] Field of Search .................. 303/10-12, 303/61, 116 PC, 115 FW, 110, 105, 113 R, 113 TR, 115 R, 115 PP, 116 R, 116 WP, DIG. 6, DIG. 5; 60/533; 417/297, 296, 298, 305, 446; 188/181 A

[56] References Cited

U.S. PATENT DOCUMENTS

| 2,018,150 | 10/1935 | Rockwell | 417/297 |
| 2,763,425 | 9/1956 | Sahle | 417/446 |
| 3,601,452 | 8/1971 | Brunner | 303/61 X |
| 3,640,587 | 2/1972 | Milner et al. | 303/10 X |
| 3,695,731 | 10/1972 | England et al. | 303/10 X |
| 3,726,568 | 4/1973 | Krugler, Jr. | 303/10 X |
| 4,025,124 | 5/1977 | Fuchs | 303/10 |
| 4,354,715 | 10/1982 | Farr et al. | 303/116 PC |
| 4,381,125 | 4/1983 | Wilson | 303/116 PC |
| 4,387,934 | 6/1983 | Farr | 303/116 PC |
| 4,715,666 | 12/1987 | Farr | 303/116 PC |
| 4,883,327 | 11/1989 | Farr | 303/116 |
| 4,988,147 | 1/1991 | Zirps | 303/10 X |

FOREIGN PATENT DOCUMENTS

| 0283348 | 9/1988 | European Pat. Off. . | |
| 0327218 | 8/1989 | European Pat. Off. . | |
| 1002780 | 3/1952 | France . | |
| 0211154 | 9/1986 | Japan | 303/116 PC |
| 0652000 | 3/1979 | U.S.S.R. | 303/10 |
| 0872787 | 10/1981 | U.S.S.R. | 417/446 |

*Primary Examiner*—Douglas C. Butler
*Attorney, Agent, or Firm*—Larry J. Palguta; Ken C. Decker

[57] ABSTRACT

A hydraulic pump comprises at least one alternating-cycle piston (20) having a suction phase and a delivery phase, and sliding in a fixed cylinder (22). The pump possesses in addition a nonreturn suction valve (32) placed between a source of fluid under low pressure (28) and a working chamber (30) defined in the cylinder, and a nonreturn delivery valve (34) placed between the working chamber (30) and an output chamber (16) for the fluid under high pressure, connected to an application circuit 10, 12). The output chamber (16) possesses a wall (40) which is movable as a function of the pressure which prevails in the output chamber (16), the movable wall (40) being capable of controlling the locking of the delivery valve (34) in an open position substantially during the greater part of the suction phase when the pressure in the output chamber (16) is greater than a given pressure, in such a way that the suction valve (32) stays closed in a corresponding manner.

7 Claims, 1 Drawing Sheet

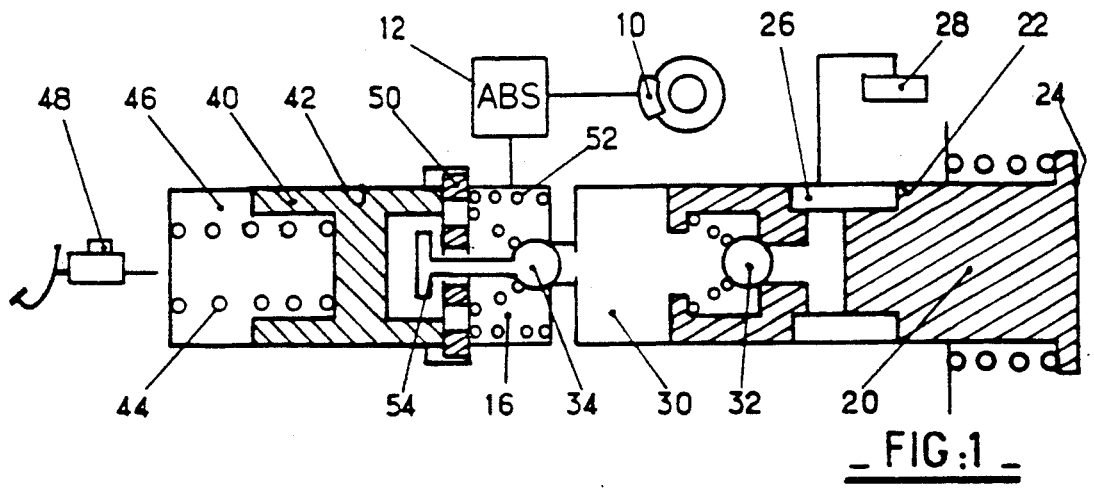
_FIG:1_
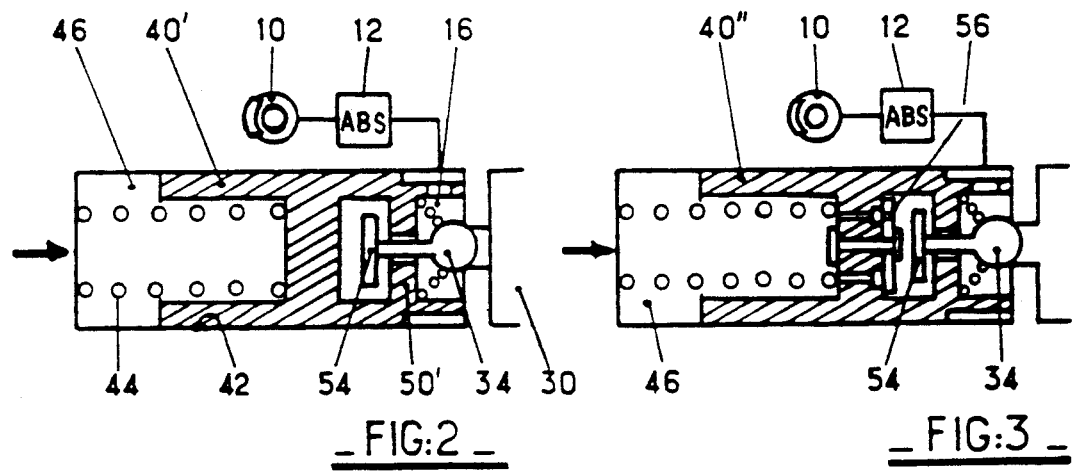
_FIG:2_   _FIG:3_
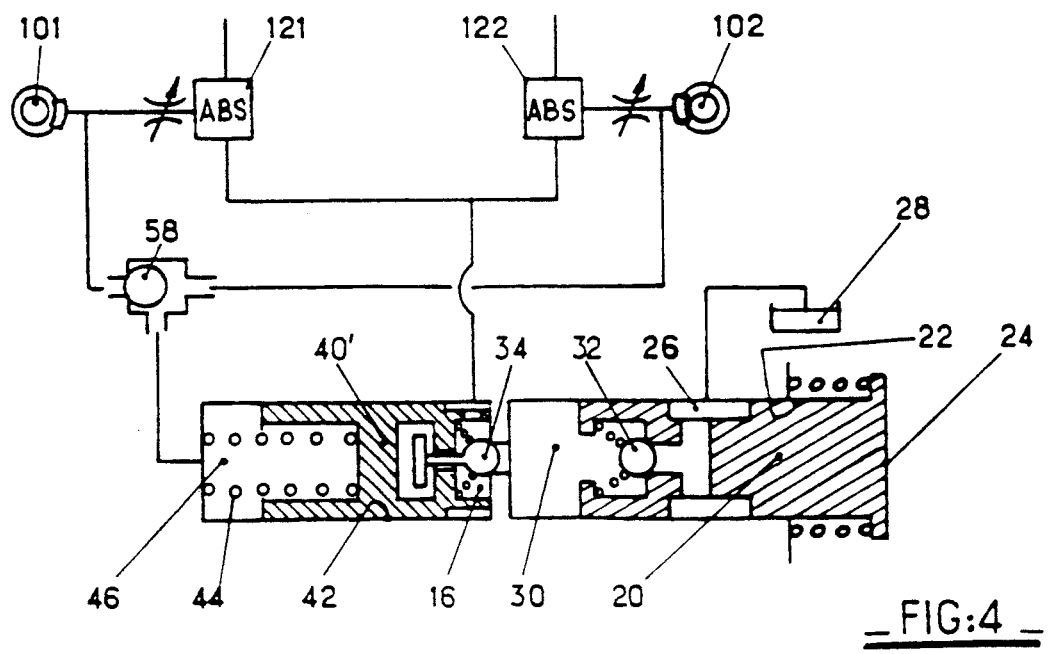
_FIG:4_

HYDRAULIC PUMP

BACKGROUND OF THE INVENTION

The present invention relates to a hydraulic pump comprising at least one alternating-cycle piston having a suction phase and a delivery phase.

Such a pump is, for example, described in U.S. Pat. No. 4,883,327 in an application to a braking circuit of a vehicle possessing an antilock device of the wheels.

The application described in the afore-mentioned document possesses serious disadvantages. For example, it is known that during the periods of pressure reduction in the brakes controlled by an electrovalve, the pressure of the fluid coming from the pump is directly applied to the working chamber of the master cylinder, and results in very unpleasant sensations for the driver.

In addition, during the periods of active operation of the antilock device, the pump is permanently working under high pressure, which leads to premature fatigue of its components.

SUMMARY OF THE INVENTION

The present invention has the object, in particular, of obviating these disadvantages.

The invention thus relates to a pump comprising at least one piston sliding in a fixed cylinder and having, in addition, a nonreturn suction valve placed between a source of fluid under low pressure and a working chamber defined in the cylinder, and a nonreturn delivery valve placed between the working chamber and an output chamber for the fluid under high pressure, connected to an application circuit.

According to a characteristic aspect of the present invention, this output chamber possesses a wall which is movable as a function of the pressure prevailing therein, this movable wall being capable of controlling the locking of the delivery valve in an open position substantially during the greater part of the suction phase when the pressure in the output chamber is greater than a given pressure. Hence, in this case, the suction valve stays closed and the pump re-aspirates the fluid that it has just delivered.

According to another aspect of the invention, the wall is movable against a spring of a given stiffness.

BRIEF DESCRIPTION OF THE DRAWINGS

The invention will now be described by way of example with reference to the accompanying drawings in which:

FIG. 1 shows schematically in section a preferred embodiment of the pump according to the invention applied to a braking circuit;

FIG. 2 shows partially and schematically in section another embodiment of the invention;

FIG. 3 shows schematically an improvement to the invention, and

FIG. 4 shows schematically an embodiment applied differently in a braking circuit.

DETAILED DESCRIPTION OF THE INVENTION

Identical structure is identified by the same reference numeral throughout the drawings.

Now with particular reference to FIG. 1, a person skilled in the art will recognize a brake 10 supplied with fluid under pressure via an antilock device 12 possessing, in a conventional manner, at least one electrovalve and connected to the output chamber 16 of a pump.

This pump possesses at least one piston 20 sliding in a bore 22 of a fixed cylinder under the effect of a rotating cam (not shown) pressing on the face 24 of the piston 20.

The suction orifice 26 of the pump is connected to a reservoir 28 of fluid under low pressure.

In a conventional manner, a nonreturn suction valve 32, made up, in the examples shown, by a ball loaded by a spring to close in the rest position the communication between the suction orifice and the working chamber 30, is placed between the working chamber 30 of the pump and the suction orifice 26.

Also in a conventional manner, a nonreturn delivery valve 34 made up of a ball loaded by a spring closes, in the rest position, the communication between the working chamber 30 and the output chamber 16.

In accordance with the invention, the output chamber 16 is a variable volume chamber. It is, in effect, constituted by the space left free by a piston 40 sliding in a bore 42 and constituting a mobile wall. The piston 40 is loaded by a spring 44 in order that when there is no pressure in the output chamber 16, this has a minimal volume. In the example shown in FIG. 1, the chamber 46 opposite the output chamber 16 with respect to the piston 40 is in communication with the working chamber of a master cylinder 48. The piston 40, at rest, bears on an annular stop 50 which itself is loaded by a spring 52 in opposition to the piston 40. This annular stop 50 is capable of moving in a groove provided to this end in the bore 42 at the same time as the piston 40. The valve 34 is provided with a tail solidly attached to a discoid stop 54 capable of cooperating with the annular stop 50.

In the example shown in FIG. 2, the annular stop 50' is solidly attached to the piston 40'.

The operation is as follows. The pump delivers, still in a conventional manner, the fluid under pressure to the output chamber 16, the valve 34 opening during the delivery phases, while the valve 32 is closed during these.

As long as the pressure in the output chamber 16 is less than a given pressure, during the suction phases, the pump operates in a conventional manner: the valve 32 opens allowing suction of the fluid from the reservoir 28 and the valve 34 is closed.

When the pressure in the output chamber 16 exceeds a value determined by the force exerted by a spring 44 and the pressure prevailing in the chamber 46, the piston 40, 40' moves (to the left in the Figures), entraining with it (at least partially in FIG. 1) the annular stop 50, 50'. For a given pressure, the annular stop 50, 50' comes into contact with the discoid stop 54 solidly attached to the valve 34 and entrains the latter in its movement. Thus, the result is that the valve 34 is no longer able to close during at least a part of the suction phase. The pump, therefore, aspirates the fluid that it has just delivered to the output chamber 16 and the valve 32 stays closed. Hence, the pressure in the output chamber 16 can no longer rise, and there is no wasted circulation fluid pumped from the reservoir 28.

Thus, a restriction of the pressure of the fluid supplied to the brake 10 to a value generally less than or equal to that prevailing in the master cylinder, and a saving of fluid, are obtained.

In addition, during the release phases of the electrovalve of the antilock device 12, during which the output chamber 16 is isolated from the application circuit, no overpressure capable of damaging or fatiguing the pump is created.

It should be observed, moreover, that when the pressure in the output chamber 16 has attained said given value allowing the valve 34 to stay open, this pressure thus exerts a favorable driving force on the drive axle of the pump.

In FIG. 3, an orifice 56 has been made in the piston 40″ in order to create a communication fitted with a restriction between the output chamber 16 and the working chamber of the master cylinder 48, but such an orifice 56 is not necessary for the good operation which has just been described. It merely allows, if necessary, a small flow of oil to be created between the master cylinder and the antilock device.

In the examples above, the chamber 46 placed behind the pistons 40, 40′, 40″ is connected to the working chamber of the master cylinder 48, to enable a modulation of the maximum pressure in the output chamber 16 as a function of that prevailing in the working chamber of the master cylinder.

A person skilled in the art will understand that this modulation is not always necessary in that the pistons 40, 40′, 40″ may only be loaded by the spring 44, the maximum pressure in the output chamber 16 only being determined, thus, by the stiffness of this spring 44 and no longer being able to be modulated.

This maximum pressure may also be modulated as a function of the pressure prevailing in the brakes. Such a modulation has been shown schematically in FIG. 4. In this FIG. 4, the pump supplies two brakes 101, 102 via an antilock device 121, 122 respectively. The rear chamber 46 is, thus, connected to the brake motor in which the greater pressure prevails by virtue of the bistable valve 58.

A person skilled in the art will be able to provide numerous modifications to the invention without departing from the scope as defined by the accompanying claims.

What we claim is:

1. A hydraulic pump comprising at least one alternating-cycle piston sliding in a fixed cylinder and having a suction phase and a delivery phase, a non-return suction valve normally closed and placed between a source of fluid under low pressure and a working chamber defined in said cylinder, and a non-return delivery valve normally closed and placed between said working chamber and an output chamber feeding fluid under high pressure to an application circuit, wherein said output chamber has a wall which is movable as a function of high pressure of fluid in said output chamber, said movable wall controlling locking of the delivery valve in an open position during a substantial part of the suction phase when the high pressure of the fluid in said output chamber is greater than a predetermined pressure and effecting closing of said suction valve, said movable wall comprising a second piston sliding in a bore and having one piston face receiving the high pressure of the fluid in said output chamber and a second piston face loaded by a spring having a predetermined stiffness, wherein said second piston face also receives a pressure prevailing in a circuit communicating a working chamber of a master cylinder with the second piston face.

2. The hydraulic pump according to claim 1, wherein an orifice is provided in said second piston and effects a fluid flow restriction between the output chamber and master cylinder.

3. The hydraulic pump according to claim 1, wherein said delivery valve possesses a stop cooperating with a corresponding stop provided in said movable wall and for entraining said delivery valve with said movable wall after a predetermined travel of the movable wall.

4. The hydraulic pump according to claim 1, wherein said movable wall entrains in a limited way a stop cooperating with a corresponding stop provided on the delivery valve to open said delivery valve after a predetermined travel of said movable wall.

5. A hydraulic pump comprising at least one alternating-cycle piston sliding in a fixed cylinder and having a suction phase and a delivery phase, a non-return suction valve normally closed and placed between a source of fluid under low pressure and a working chamber defined in said cylinder, and a non-return delivery valve normally closed and placed between said working chamber and an output chamber feeding fluid under high pressure to an application circuit, wherein said output chamber has a wall which is movable as a function of high pressure of fluid in said output chamber, said movable wall controlling locking of the delivery valve in an open position during a substantial part of the suction phase when the high pressure of the fluid in said output chamber is greater than a predetermined pressure and effecting closing of said suction valve, said movable wall comprising a second piston sliding in a bore and having one piston face receiving the high pressure of the fluid in said output chamber and a second piston face loaded by a spring having a predetermined stiffness, wherein said second face also receives a pressure prevailing in a circuit communicating said application circuit with the second piston face.

6. The hydraulic pump according to claim 5, wherein said delivery valve possesses a stop cooperating with a corresponding stop provided in said movable wall and for entraining said delivery valve with said movable wall after a predetermined travel of the movable wall.

7. The hydraulic pump according to claim 5, wherein said movable wall entrains in a limited way a stop cooperating with a corresponding stop provided on the delivery valve to open said delivery valve after a predetermined travel of said movable wall.

* * * * *